S. L. JEFFORDS.
BAIT CLIP.
APPLICATION FILED MAR. 4, 1919.
1,320,762. Patented Nov. 4, 1919.
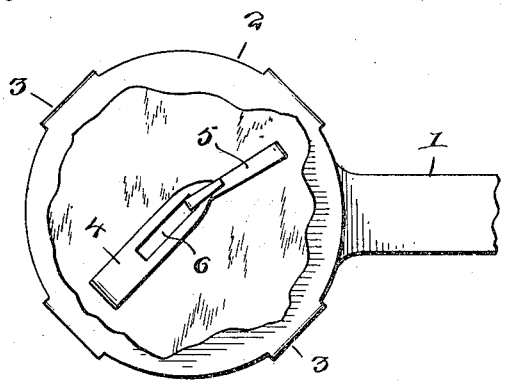
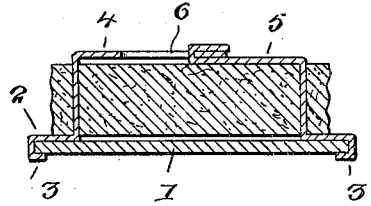
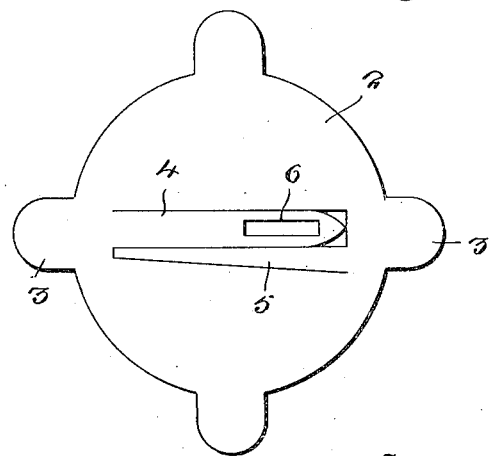
Inventor
S. L. Jeffords
Witnesses
E. R. Ruppert
By Victor J. Evans
Attorney

UNITED STATES PATENT OFFICE.

SAMUEL L. JEFFORDS, OF CANAVERAL, FLORIDA.

BAIT-CLIP.

1,320,762. Specification of Letters Patent. Patented Nov. 4, 1919.

Application filed March 4, 1919. Serial No. 280,554.

*To all whom it may concern:*

Be it known that I, SAMUEL L. JEFFORDS, a citizen of the United States, residing at Canaveral, in the county of Brevard and State of Florida, have invented new and useful Improvements in Bait-Clips, of which the following is a specification.

This invention has reference to means for effectively sustaining bait on the pan or table of an animal trap.

The object of the invention is to produce a device of this character which can be secured upon the pan or table without the employment of tools and without the employment of means auxiliary to the device, the said device being integrally formed with interengaging members which are passed into the bait and brought to interlocking engagement for holding the bait on the device, and consequently on the table or pan of the trap.

It is a further object of the invention to produce a device of this character which shall be of an extremely simple construction, easily applied and thoroughly efficient for the purpose for which it is devised.

Other objects and advantages will appear as the nature of the invention is better understood, reference being had to the accompanying drawings, in which:

Figure 1 is a view illustrating the application of the improvement.

Fig. 2 is a sectional view through the improvement illustrating the interlocking engagement of the tongues of the device.

Fig. 3 is a plan view of the improvement.

Referring now to the drawings in detail, the numeral 1 designates the pan or table of an ordinary spring trap, and the numeral 2 designates my improvement.

The improvement is in the nature of a flat disk-shaped plate, having right angle extensions which are bendable and which are indicated by the numerals 3.

Preferably the improvement is constructed of a thin metal sheet of a bendable nature and embodying sufficient resiliency to permit of the projections or lugs 3, when bent around the edges of the pan or table 1, to insure the retention of the device on the said pan or table.

The flat body of the improvement is approximately centrally slit both longitudinally and transversely to provide between the slits an oppositely directed tongue 4 and finger 5. The finger is gradually reduced in thickness from its connection with the body proper to the outer and free end thereof so that the said finger is V-shaped in plan. The tongue 4 may have its free end pointed and is provided inward of the said end with an elongated slot 6 designed to receive therein the pointed end of the finger 5, after the tongue 4 has been inserted in the bait 7, and the finger 5 likewise inserted in the bait. If desired, the end of the finger may be bent over the tongue, and when the tongue and fingers are brought into interengagement, as above described, the bait is securely hooked upon the device and upon the pan or table of the trap.

Having thus described the invention, what is claimed as new, is:—

1. A device for the purpose set forth, comprising a flat body having bendable lugs projecting therefrom, a tongue, a finger designed to interlock with the tongue, and said tongue and finger extending from the outer face of the flat body inward of two of the diametrically opposite edges thereof and being arranged over the said body.

2. A bait clip comprising a flat member having angularly arranged projections forming bendable lugs, said member being slitted at the center thereof both longitudinally and transversely to provide a bendable tongue and an oppositely extending bendable finger, and said tongue having a slot therein to receive said finger.

In testimony whereof I affix my signature.

SAMUEL L. JEFFORDS.